United States Patent
MacLaughlin (10) Patent No.: US 9,958,558 B2
(45) Date of Patent: May 1, 2018

(54) WIRELESS DIGITAL DETECTOR HOUSING WITH INSCRIBED CIRCUITRY

(71) Applicant: Carestream Health, Inc., Rochester, NY (US)

(72) Inventor: Scott T. MacLaughlin, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 43 days.

(21) Appl. No.: 15/098,464

(22) Filed: Apr. 14, 2016

(65) Prior Publication Data

US 2017/0299735 A1   Oct. 19, 2017

(51) Int. Cl.
*G01T 1/24* (2006.01)
*G01T 1/20* (2006.01)
*G01T 7/00* (2006.01)

(52) U.S. Cl.
CPC ............ *G01T 1/247* (2013.01); *G01T 1/2018* (2013.01); *G01T 7/00* (2013.01)

(58) Field of Classification Search
None
See application file for complete search history.

(56) References Cited

U.S. PATENT DOCUMENTS

| 6,919,221 | B2 * | 7/2005 | Linke | H05K 3/182 438/106 |
| 7,804,450 | B2 | 9/2010 | Sullivan et al. | |
| 8,803,744 | B2 * | 8/2014 | Jia | H01Q 1/243 343/702 |
| 2008/0304246 | A1 * | 12/2008 | Utschig | A61B 6/4233 361/818 |
| 2009/0059543 | A1 | 3/2009 | Choe et al. | |
| 2012/0268335 | A1 | 10/2012 | Zhang et al. | |
| 2015/0008330 | A1 | 1/2015 | MacLaughlin et al. | |
| 2015/0280312 | A1 | 10/2015 | Poggio | |

FOREIGN PATENT DOCUMENTS

EP   2 237 106 A1   10/2010

OTHER PUBLICATIONS

Brochure entitled "Three —Dimensional Circuits LPKF LDS: Laser Direct Structuring for 3D Molded Interconnect Devices," from LPKF AG, Garbsen, DE. (1797-Ipkf-direct-structuring-en.pdf), 16 pages, 2016.
Niels Heininger, "Three-dimensional circuit boards for New Products," Microsystems Technology in Germany, 2012, pp. 38-39, XP055392560, Retrieved from Internet: URL: http://www.optik-bb.de/sites/default/files/download-dokument/mst_2012_online.pdf.
European Search Report dated Jul. 28, 2017 for European Patent Application No.17 165 813.1, 2 pages.

* cited by examiner

*Primary Examiner* — Edwin Gunberg (57) ABSTRACT

A digital x-ray detector has a non-metallic housing. A two dimensional array of photosensors enclosed by the housing is in electrical communication with an electrical circuit formed on an interior surface of the housing.

20 Claims, 6 Drawing Sheets

WIRELESS DIGITAL DETECTOR HOUSING WITH INSCRIBED CIRCUITRY

FIELD OF THE INVENTION

The invention relates generally to the field of medical imaging and more particularly relates to apparatus and methods for forming an x-ray detector having circuitry formed directly on inner surfaces of the detector housing.

BACKGROUND

Digital radiography (DR) imaging converts incident x-ray radiation energy to pixelated digital image content using a scintillator material that converts the x-ray energy to light for detection by an array of photodetectors. The portable DR detector has a housing that supports and protects the scintillator material and its accompanying photodetector array and also contains various other types of circuitry for providing power, control, and data communication for the detector.

Requirements for packaging of the sensing and support components within the detector housing are demanding. Conventional housing arrangements are typically characterized by high component count, complex cable routing, and proliferation of mounting hardware including fasteners, standoffs, spacers, clips, seals, cushioning, and related components. As a result, weight, size, reliability, assembly time, and cost remain areas needing improvement. Even with the advent of more lightweight photodetector array substrates and housing materials, including plastics and composites, cost, complexity, and weight can still pose formidable problems to be addressed.

Among challenges when using a non-metal housing are the need for providing a common ground plane for internal components and EMI (electro-magnetic interference) shielding requirements, both to shield internal circuitry from external EMI sources and to provide conformance to requirements for low EMI emission from the DR detector. A metal housing inherently provides these requirements. Alternate strategies must be used for providing these structural and electrical features when using plastic or composite housings.

Conventional component packaging solutions tend to constrain the amount of surface area available for image acquisition. The photodetector array, typically formed on a separate glass substrate or other substrate, including flexible substrates, is constrained by the housing size as well as by the need for additional space along one or more edges, such as for handling and for drop shock protection. In addition, space must be allotted for wire harnesses/flex cables needed to transfer the received signals to printed circuit board assemblies for signal processing. Thus, there would also be advantages to packaging approaches that help to alleviate spacing problems and to increase the available imaging area within the detector housing.

Thus, there is need for approaches that can simplify assembly, advance reliability, increase imaging area, and help to further reduce weight and complexity of assembly for DR detectors.

SUMMARY

An aspect of this application is to advance the art of medical digital radiography and to address, in whole or in part, at least the foregoing and other deficiencies of the related art. It is another aspect of this application to provide in whole or in part, at least the advantages described herein. For example, certain exemplary embodiments of the application address the need to reduce the number and complexity of fasteners, cables, and interconnect components in DR detector design, as well as to reduce weight and size requirements.

In one embodiment, a digital x-ray detector includes a non-metallic housing and a two dimensional array of photosensors enclosed by the housing. An electrical circuit is formed on, or embedded in, an interior surface of the housing and is in electrical communication with the array of photosensors.

In another embodiment, a method for forming a digital radiography detector includes molding a housing from a plastic or composite material, conditioning a pattern on an internal surface of the housing for metallization, plating the conditioned pattern to form conductors on the internal surface, and fastening the housing to the detector to complete an electrical connection between the detector and the conductors.

In another embodiment, a digital radiographic detector includes a housing enclosing a radiographic detector array that captures radiographic image data. Conductive tracks are formed on an interior surface of the housing and are electrically connected to the detector array. The conductive tracks include an antenna. An integrated circuit chip is electrically connected to the conductive tracks, and is configured to receive the radiographic image data over the conductive tracks and transmit the radiographic image data over the antenna.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DESCRIPTION OF EXEMPLARY EMBODIMENTS

The following is a description of exemplary embodiments, reference being made to the drawings in which the same reference numerals identify the same elements of structure in each of the several figures.

Where they are used in the present disclosure, the terms "first", "second", and so on, do not necessarily denote any ordinal, sequential, or priority relation, but are simply used to more clearly distinguish one element or set of elements from another, unless specified otherwise.

As used herein, the term "energizable" relates to a device or set of components that perform an indicated function upon receiving power and, optionally, upon receiving an enabling signal.

In the context of the present disclosure, the phrase "in signal communication" indicates that two or more devices and/or components are capable of communicating with each other via signals that travel over some type of signal path. Signal communication may be wired or wireless. The signals may be communication, power, data, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

Figure 1:
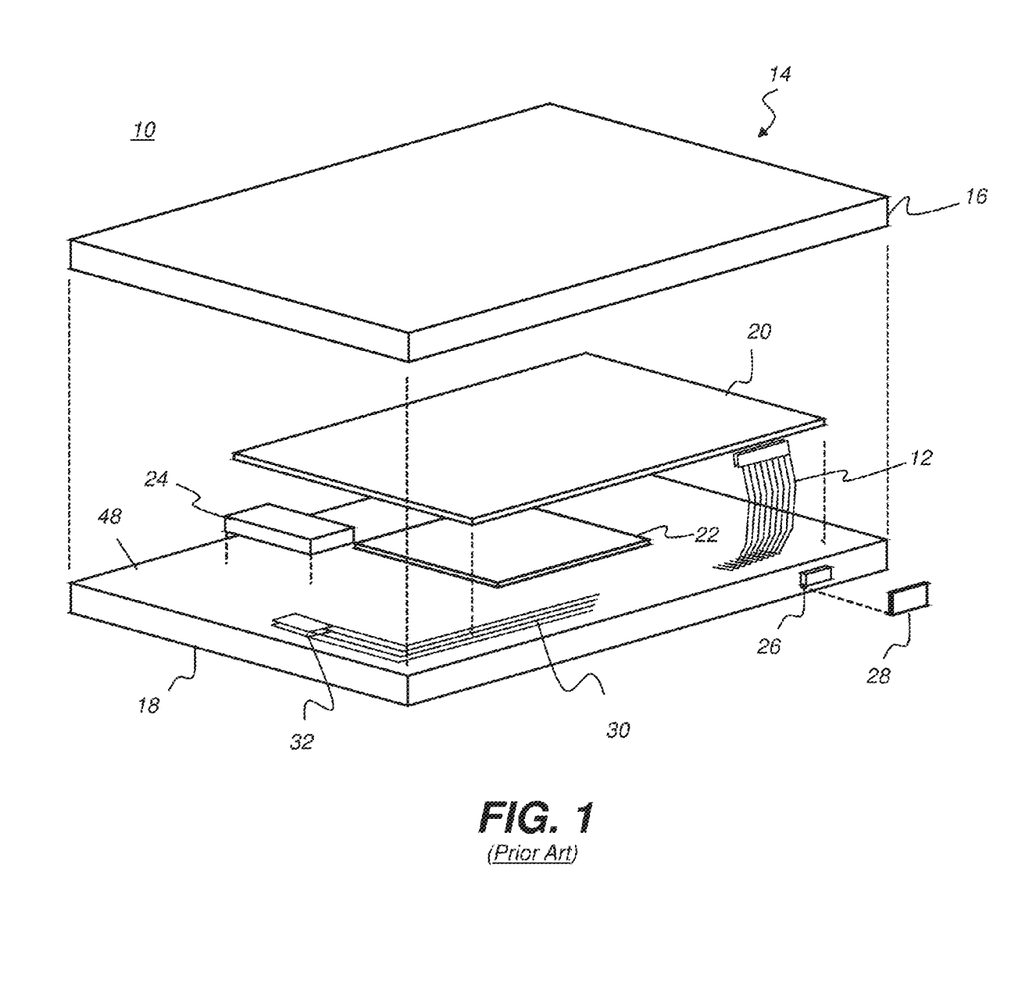
FIG. 1 is an exploded, perspective view showing components of a DR detector, as packaged within a housing.

The exploded view of FIG. 1 shows, in simplified form, some of the electrically active internal components of a DR detector 10 that are protected within an enclosure or housing 14 formed using multiple parts, including top and bottom covers 16 and 18. A detector array 20 includes a scintillator layer that generates output light energy when energized by x-ray exposure, and electromagnetic radiation sensitive elements disposed in a two-dimensional array for capturing image signals from received radiation to provide data for imaging pixels. A circuit board 22 provides supporting control electronics components for image data acquisition and wireless transmission to an external host system. A battery 24 provides power, acting as the voltage source for detector 10 operations. A port 26 extending through bottom cover 18 is provided to allow electrical connection for receiving and transmitting data, and/or receiving power such as from a voltage supply. The port may have an optional cover plate or sealing cap 28, which may be a rubber seal or other liquid-proofing material. In addition to the illustrated components, a number of interconnecting cables, supporting fasteners, cushioning materials, connectors, and other elements may be used for packaging and protecting the DR detector circuitry. An optional antenna 30 and transmitter 32 for wireless communication may alternately be provided, with antenna 30 extending within the housing 14. Top and bottom housing covers 16 and 18 may be fastened together along a mating surface 48. One or more cables 12, such as multi-wire flexible cables, may also be included within housing 14 for interconnection between components.

Figure 2:
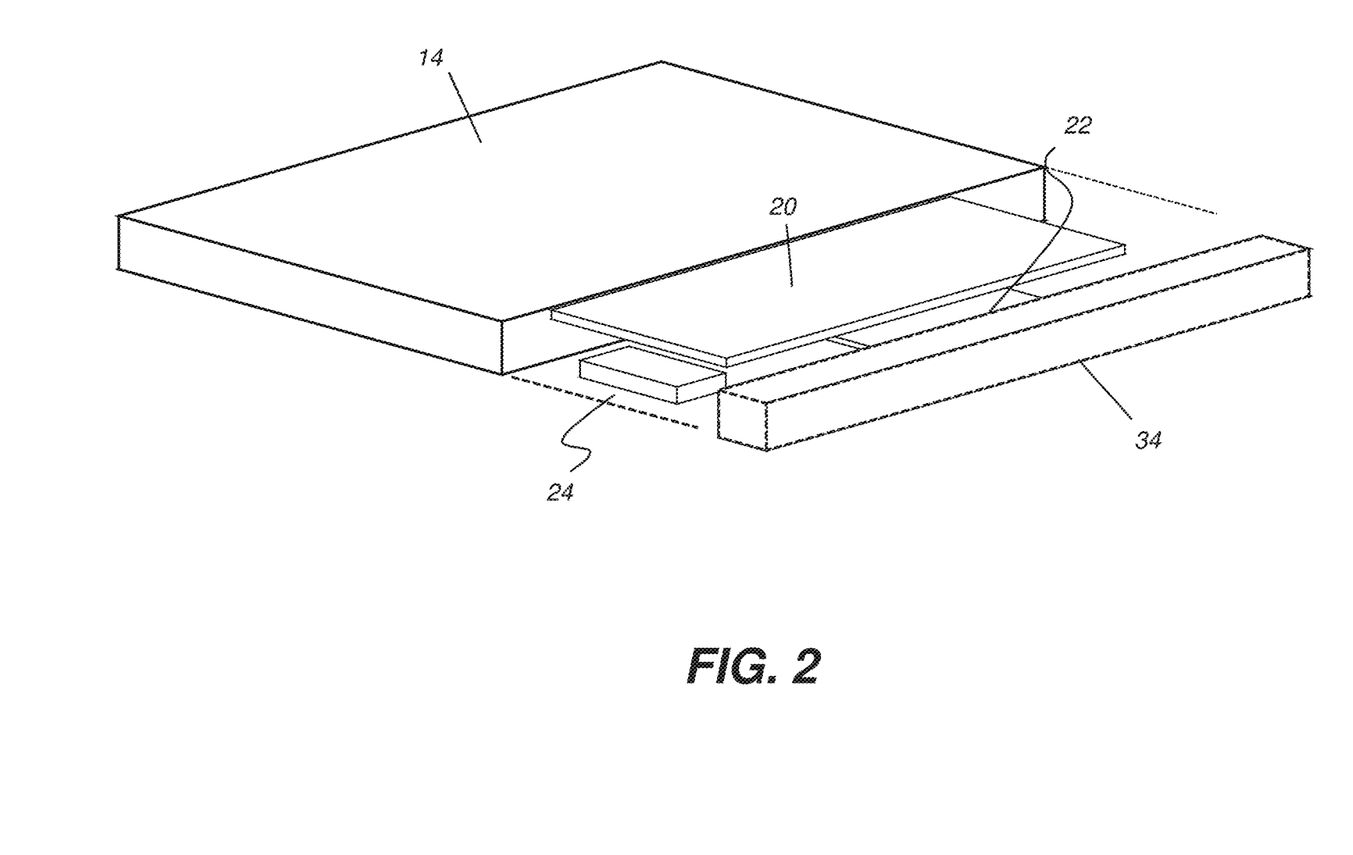
FIG. 2 is an exploded, perspective view showing components of a DR detector according to an alternate packaging embodiment.

The exploded view of FIG. 2 shows an alternate embodiment of DR detector 10, in which detector array 20, circuit board 22, and battery 24, along with interconnection and other support components, slide into an enclosure or housing 14 through an open end thereof. A lid 34 may be fastened to housing 14 to provide a protective seal.

Embodiments of the present disclosure address the need for improved packaging and reduced parts count, along with the need for increased imaging area, smaller size, and reduced weight using inscribed circuitry, formed directly onto inner surfaces of a non-metallic detector housing. Inscribed circuitry can eliminate the need for separately provided printed circuit boards (PCBs) that are mounted against the housing using screws or other fasteners and are interconnected with each other using a cabling harness, for example.

Figure 3:
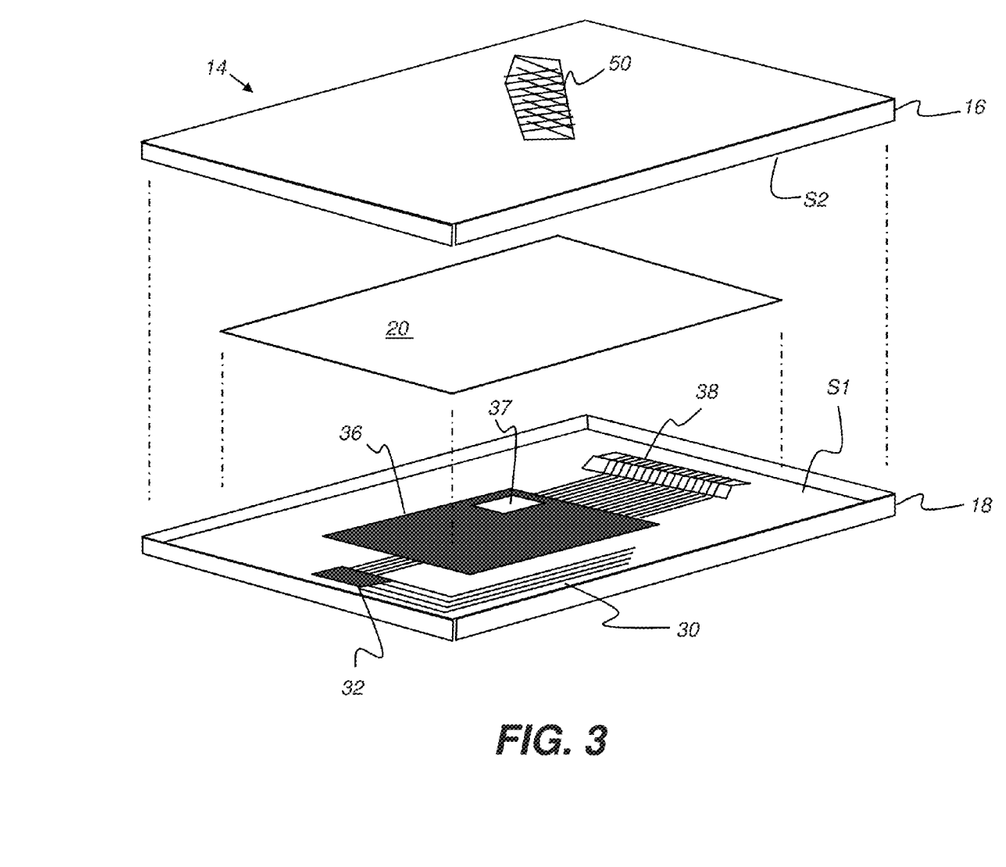
FIG. 3 is an exploded, perspective view showing components of a DR detector having inscribed circuitry and connectors according to an embodiment of the present disclosure.

FIG. 3 is an exploded, perspective view showing components of a DR detector 40 disposed within an interior of a housing formed at least in part by covers 16, 18, wherein the housing includes inscribed electrical circuitry according to an embodiment of the present disclosure. In the example shown, a circuit 36, transmitter 32, and antenna 30 for wireless communication, are made of conductive material formed, or inscribed, directly onto an interior surface S1 of non-metallic housing cover 18. The inscribed conductors described herein may be partially or wholly embedded in the interior surface S1 of the housing. The conductors formed on the surface S1 may also not be embedded, rather, formed on top of the interior surface S1 of the housing. If wholly embedded, such as being formed by laser, or etch patterning, methods described herein, a surface of the conductor may be coplanar with the interior surface S1 of the housing, or the surface of the conductor may be below the interior surface S1 of the housing. If partially embedded, such as by using the methods described herein, a surface of the conductor may be raised above the interior surface S1 of the housing. If not embedded, such as being formed by deposition or ejection printing methods described herein, a surface of the conductor may be raised above the interior surface S1 of the housing at a height equal to a thickness of the conductor. A thickness of the inscribed conductor may range from about 3 μm to about 10 μm, or even greater, depending on electrical characteristics required by a particular use of the inscribed circuitry. For signal carrying or data communication purposes, the formed conductor traces may be selected to be thinner and narrower ("narrow" referring to a width dimension across the surface S1) as compared to conductive traces formed for shielding. For shielding purposes, the conductive traces may be formed as a pattern of parallel or intersecting traces at any selected width up to about 0.2 inches wide. A conductive pattern may include a continuous conductive surface (e.g. as circuit 36 of FIG. 3) spanning two (2) or more inches in each of two perpendicular directions at a thickness ranging from about 3 μm to about 10 μm to form a solid conductive shield. Similarly, an antenna formed on the interior surface S1 may be formed up to about 0.2 in wide or greater, as desired, and having a length of about one (1) or more inches. The interior surface S1 is opposite an exterior surface of the non-metallic housing cover 18, and is not visible from the exterior of the housing 18 when the top and bottom housing covers 16 and 18 are fastened together. Cover 18 can be formed from a molded thermoplastic, elastomer, thermoset plastic, or from a suitable composite material.

A connector 38 may also be formed in a raised feature having a pattern of conductors, such as a plurality of parallel conductors. A plurality of parallel conductors in a substantially common plane (formed on the surface S1) may include conductors each having a width of about 75 μm up to about 150 μm and separated by an equivalent gap of about 75 μm up to about 200 μm, and having a thickness ranging from about 3 μm to about 10 μm. The conductive tracks may include an individual track or a plurality of parallel conductive tracks that may be formed as linear tracks, curved tacks, tracks that include a bend of 90°, or tracks that include a bend of 180°—extending in one direction and bending back in an opposite direction. Circuit 36 may include inscribed conductors formed on surface S1 and one or more electronic components, such as integrated circuit (IC) chips 37, which may include memory chips, controllers, signal processors, or other discrete components such as resistors, inductors, capacitors, or arrays, for example, that are electrically connected to the inscribed conductors on the surface of S1. The inscribed conductors may be used to establish data communication signal lines between the electronic components. Such data communication may include digital image data transmitted between the electronic components. The digital image data may include image data captured by the detector array 20. Circuit 36 can include one or more planar, curved, parallel, or intersecting shielding conductors that encompass localized or broad areas of the housing, for example. Circuit 36 can alternately include a patterned shield or a ground plane. In an alternate embodiment, circuit 36 may include detector array 20, formed directly on an interior side of either or both covers 16, 18. A portion of a shield 50 is shown in outline, and is formed on an interior surface S2 of cover 16 in this exemplary embodiment. Although a cross-hatched pattern is shown, shield 50 may be solid, as in the form of a continuous conductor layer of several square inches, or have any pattern, such as a planar curvilinear pattern, or other parallel pattern, that provides the desired protection from electro-magnetic interference. Shielding may be provided to envelop all of the DR detector interior components or can be localized for particular circuitry of the detector.

EMI shielding formed directly onto an interior surface of the housing of the DR detector can help to protect the detector components from low or high frequency noise emitted from nearby sources. In addition, the EMI shielding may be useful for conformance to EMI emission standards for the DR detector itself. These can include, for example, standards from the International Electrotechnical Commission, such as IEC 60601 for medical electrical equipment. The IEC standards limit the amount of EMI energy emitted from a medical device so that it does not interfere with operation of nearby equipment.

Figure 4:
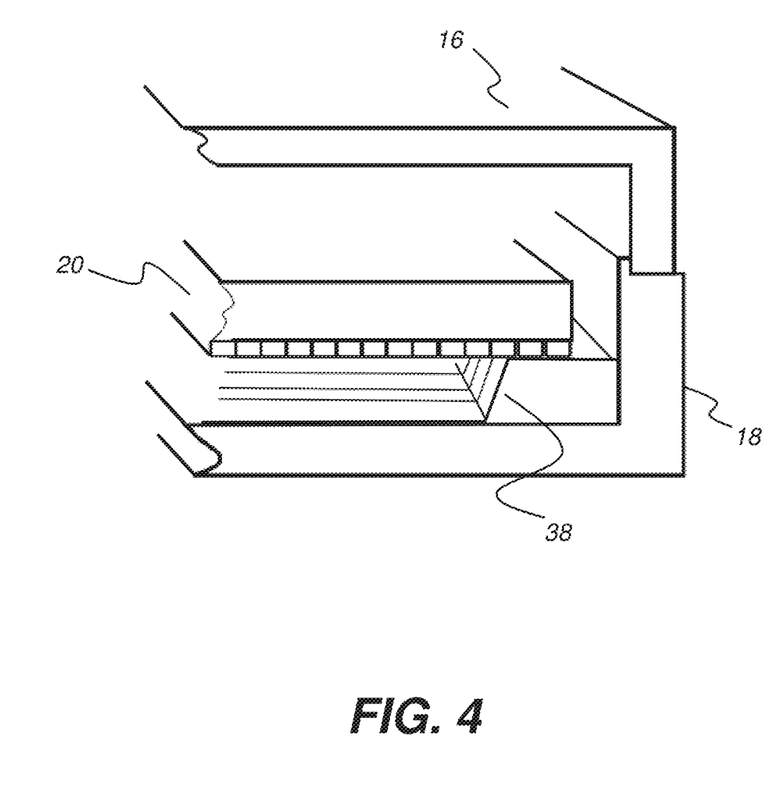
FIG. 4 is a cutaway view showing a portion of an assembled DR detector having inscribed circuitry.

FIG. 4 is a cutaway view showing a portion of an assembled DR detector having inscribed circuitry that includes a portion of connector 38. In the embodiment shown, detector array 20 is seated in electrical communication onto inscribed connector 38 which allows detector array 20 to transmit and receive signals over the inscribed conductors of connector 38 to and from other circuitry in detector 40 that is also in electrical communication with connector 38, without using a conventional cable connection. The inscribed conductors of connector 38 may be continuously formed along perpendicular interior surfaces of the housing, as shown in FIG. 4, wherein the conductors of connector 38 traverse in a continuous fashion a horizontal surface then a vertical surface adjacent thereto, then another horizontal raised surface adjacent the vertical surface.

Among methods that can be used for forming inscribed circuitry is laser direct structuring (LDS). LDS utilizes specially formulated plastic or composite materials that include additives that can be activated by laser energy to promote retention of deposited metal on a plastic or composite surface.

Figure 5:
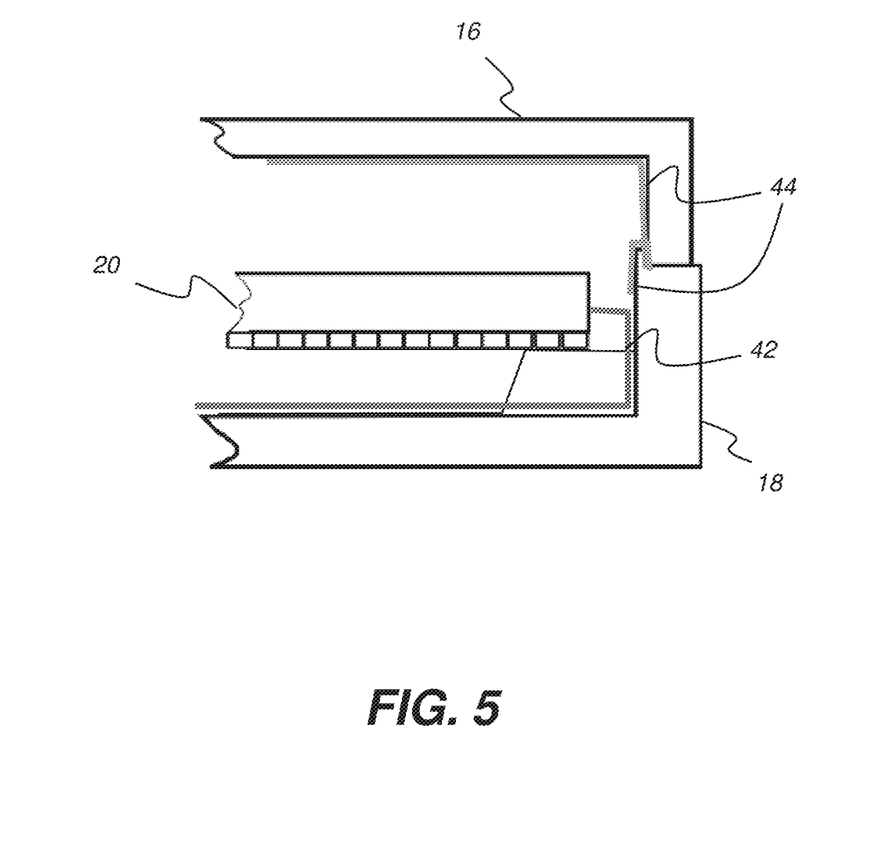
FIG. 5 is a cutaway side view that shows a conductive trace having perpendicular portions.

FIG. 5 is a cutaway side view that shows an advantageous use of inscribed circuitry. Inscribed conductive traces are not subject to many of the limitations of conventional connectors, such as constraints on radius bend for connector cables, for example. Here, a continuous conductor 42 can have an abrupt right angle turn in order to extend across two perpendicular surfaces. As is also shown in FIG. 5, fastening a top cover 16 to a bottom cover 18 may also complete a connection between conductors 44 disposed on each of the top and bottom covers, such as to complete a circuit, to provide an enveloping EMI shield, or to provide a ground plane connection.

In addition to forming circuitry and components of various types directly onto inner housing surfaces, embodiments of the present disclosure also provide straightforward methods for providing a common ground for improved signal transmission, as well as shielding for EMI protection where a nonmetal housing is used. A metal trace formed onto an interior surface or embedded within a portion of the nonmetal housing may act as a common ground plane and also act as a high/low frequency shield. Metal traces or layered structures can be embedded in one or both housing covers 16, 18, such as above and/or below the circuitry that needs shielding. It should be noted that shielding may or may not enclose all internal components, since not all electronic circuitry is equally sensitive to external electronic noise.

Figure 6:
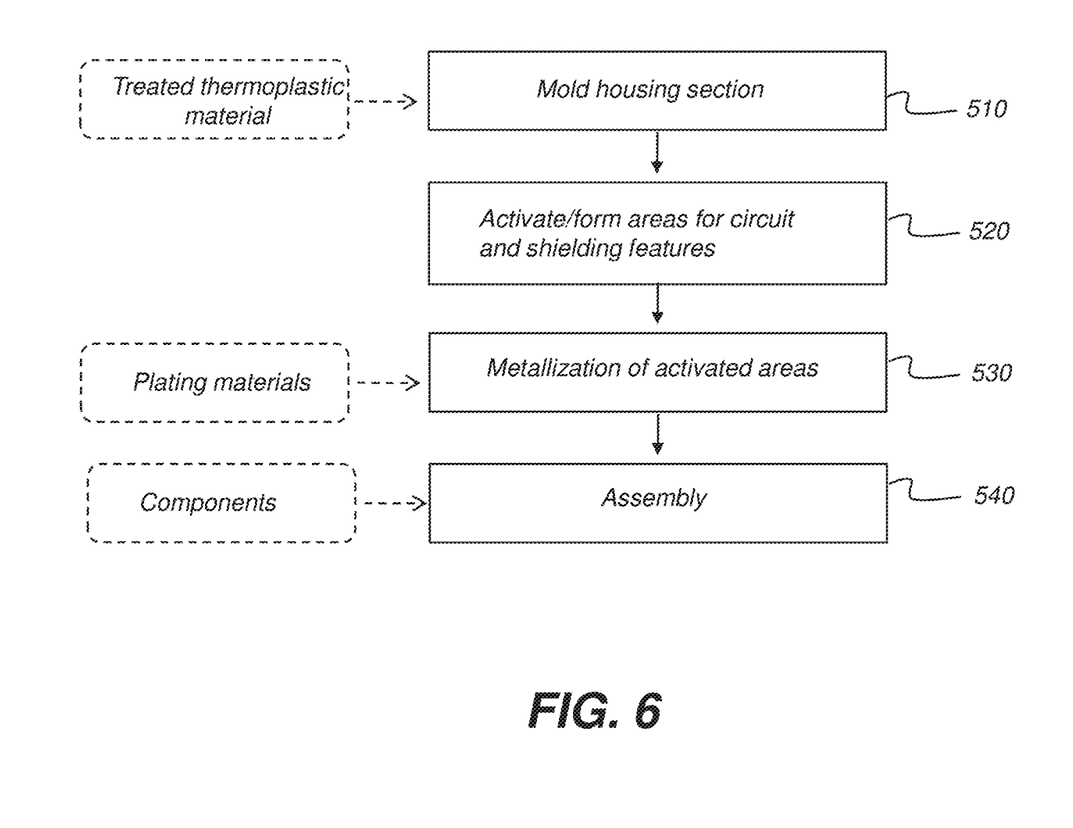
FIG. 6 is a flow diagram that shows a process for laser direct structuring to form inscribed DR detector circuitry according to an embodiment of the present disclosure.

The flow diagram of FIG. 6 shows a process for laser direct structuring to form DR detector circuitry according to an embodiment of the present disclosure. In a molding step 510, cover portions of the housing 14 (FIG. 3) are formed, such as from a thermoplastic material having one or more suitable additives, such as those listed herein. An activation step 520 may include conditioning interior surfaces of the treated thermoplastic material using etchants, laser light or other suitable source of directed heat. This conditioning causes a chemical reaction with the additive, forming metallic seeds that promote subsequent metallization. In addition, laser conditioning causes surface roughening that supports adhesion and anchoring of metal for circuit components. Activation can condition a pattern of spaced-apart circuit leads or traces, for example. Alternately, activation step 520 can condition one or more broad areas of the interior surface, such as to form an EMI (electromagnetic interference) protection shield, for example. The shield may comprise a solid pattern or may utilize another pattern, such as a cross-hatched pattern.

Continuing with the FIG. 6 process, a metallization step 530 applies conductive metal material to the conditioned pattern. Metallization can be performed using copper baths for progressive build-up of conductive traces. Alternately, other metal deposition methods can be used, including inkjet (ejection) printing, vapor deposition, or other methods compatible with the interior surface of the housing. Following one or more optional testing steps (not shown), an assembly step 540 then allows the additional processing for circuit preparation, which can include coatings application, component placement, flow soldering, and other circuit assembly tasks used to populate and interconnect a pattern of etched, lasered, or otherwise inscribed, circuit traces, for example. Assembly can also complete electrical connections between deposited, inscribed circuit components, such as closing connection to an applied shield, for example.

According to an alternate embodiment, one or more electronic components are formed directly onto the inscribed circuitry.

Suitable thermoplastics for injection molding and subsequent inscribed circuitry formation can include, for example, any of polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or any combination thereof.

Additives for treatment of thermoplastic molding materials for laser activation include non-conductive spinel-based inorganic oxide, such as spinel type copper.

The invention has been described in detail, and may have been described with particular reference to a suitable or presently preferred embodiment, but it will be understood that variations and modifications can be effected within the spirit and scope of the invention. In addition, while a feature(s) of the invention can have been disclosed with respect to only one of several implementations/embodiments, such feature can be combined with one or more other features of other implementations/embodiments as can be desired and/or advantageous for any given or identifiable function. The term "at least one of" is used to mean one or more of the listed items can be selected. The term "about" indicates that the value listed can be somewhat altered, as long as the alteration does not result in nonconformance of the process or structure to the illustrated embodiment. Finally, "exemplary" indicates the description is used as an example, rather than implying that it is an ideal. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed:

1. A digital x-ray detector comprising:
    a non-metallic housing comprising two or more sections configured to be fastened together;
    a two dimensional array of photosensors enclosed by the sections of the housing fastened together, the two dimensional array of photosensors configured to capture image signals from received radiation;
    control electronics for acquiring image data from the captured image signals, the control electronics enclosed by the sections of the housing fastened together; and
    a first electrical circuit inscribed on an interior surface of at least one of the sections of the housing,
    wherein the interior surface faces toward the two dimensional array of photosensors, the first electrical circuit is in electrical communication with the control electronics, and wherein the first electrical circuit is in electrical communication with the photosensors to provide data communication between the control electronics and the photosensors.

2. The digital x-ray detector of claim 1, wherein the first electrical circuit comprises an antenna.

3. The digital x-ray detector of claim 1, further comprising one or more electronic chips mounted on the interior surface in electrical communication with the first electrical circuit.

4. The digital x-ray detector of claim 1, further comprising a second electrical circuit formed on an interior surface of the housing and having a planar shape to form an electrical shield.

5. The digital x-ray detector of claim 1, further comprising a second electrical circuit formed on an interior surface of the housing and having a crosshatch pattern to form an electrical shield.

6. The digital x-ray detector of claim 1, wherein the interior surface of the housing comprises two perpendicular surfaces and wherein the first electrical circuit comprises at least three parallel continuous conductive tracks traversing the two perpendicular surfaces.

7. The digital x-ray detector of claim 1, further comprising a battery configured to provide electrical power for operating the detector.

8. The digital x-ray detector of claim 1, wherein the housing is formed from a plastic material selected from the group consisting of polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or a combination thereof.

9. The digital x-ray detector of claim 1, wherein the housing is formed from a composite material.

10. The digital x-ray detector of claim 1, wherein the two dimensional array of photosensors is formed on an interior surface of the housing.

11. The digital detector of claim 2, wherein a width of the antenna is about 0.2 inches or less, a length of the antenna is about 2 inches or less, and a thickness of the antenna ranges from about 3 µm to about 10 µm.

12. The digital detector of claim 6, wherein the first electrical circuit comprises conductive tracks each having a width from about 75 µm up to about 150 µm and separated by gaps of about 75 µm up to about 200 µm.

13. The digital detector of claim 12, wherein the conductive tracks comprise a thickness of about 3 µm up to about 10 µm.

14. The digital detector of claim 3, wherein two of the mounted electronic chips are configured to communicate digital image data over the first electrical circuit.

15. A method for forming a digital radiography detector comprising an array of photosensors, the method comprising:
    molding housing cover sections using a plastic or composite material;
    conditioning a pattern on an internal surface of at least one of the housing cover sections for forming metallization tracks thereon;
    plating the conditioned pattern to form the metallization tracks on the internal surface of said at least one of the housing cover sections; and
    fastening the housing cover sections together including connecting at least one of the housing cover sections to the array of photosensors to complete an electrical connection from the photosensors to the metallization tracks to provide image data communication from the photosensors over the metallization tracks, and including enclosing the array of photosensors by the step of fastening the housing cover sections together.

16. The method of claim 15, further comprising installing a battery within the housing cover sections and configuring the battery to provide power for operating the detector.

17. The method of claim 15, further comprising populating the conditioned pattern with electronic components.

18. The method of claim 15, wherein the metallization tracks form part of a shield against electromagnetic interference.

19. The method of claim 15, wherein fastening the housing cover sections together completes a circuit, ground, or shield connection.

20. A digital radiographic detector comprising:
    a housing enclosing a radiographic detector array, the detector array for capturing radiographic image data from received radiation;
    a battery enclosed by the housing;
    conductive tracks inscribed on an interior surface of the housing, the conductive tracks electrically connected to the detector array, the conductive tracks including an antenna; and
    an integrated circuit chip enclosed by the housing and electrically connected to the conductive tracks, the integrated circuit chip configured to receive the radiographic image data from the detector array over the conductive tracks and to transmit the radiographic image data over the antenna,
    wherein the battery is configured to provide electric power for operating the detector.

* * * * *